United States Patent [19]

Sarson et al.

[11] Patent Number: 4,566,096
[45] Date of Patent: Jan. 21, 1986

[54] TELEPHONE EXCHANGE CONFERENCE CIRCUIT

[75] Inventors: Gary A. Sarson, Ottawa, Canada; Michael P. McKenzie, Enfield, England

[73] Assignee: Standard Telephones and Cables, Public Limited Company, London, England

[21] Appl. No.: 538,412

[22] Filed: Oct. 6, 1983

[30] Foreign Application Priority Data

Oct. 8, 1982 [GB] United Kingdom ............... 8228844

[51] Int. Cl.$^4$ .................................... H04Q 11/04
[52] U.S. Cl. ............................................. 370/62
[58] Field of Search .................... 370/62; 179/18 BC

[56] References Cited

U.S. PATENT DOCUMENTS

| 3,967,070 | 6/1976 | Srivastava | 370/62 |
| 4,031,328 | 6/1977 | Pitroda | 370/62 |
| 4,054,755 | 10/1977 | Lee et al. | 370/62 |
| 4,175,215 | 11/1979 | McLaughlin et al. | 179/18 BC |
| 4,267,593 | 5/1981 | Regan et al. | 370/62 |
| 4,271,502 | 6/1981 | Goutmann et al. | 370/62 |
| 4,388,717 | 6/1983 | Burke | 370/62 |

FOREIGN PATENT DOCUMENTS

| 1476122 | 6/1977 | United Kingdom . |
| 1498316 | 1/1978 | United Kingdom . |
| 1521209 | 8/1978 | United Kingdom . |
| 1528240 | 10/1978 | United Kingdom . |
| 1529106 | 10/1978 | United Kingdom . |
| 2032731 | 9/1979 | United Kingdom . |
| 2091067 | 7/1982 | United Kingdom . |

Primary Examiner—Douglas W. Olms
Assistant Examiner—Curtis Kuntz
Attorney, Agent, or Firm—Kerkam, Stowell, Kondracki & Clarke

[57] ABSTRACT

A telephone exchange conference circuit for three-party conferences, receives the PCM bytes from the conferees in a FIFO store (4), and checks the bytes in a processor (1) to find the one for the loudest outgoing speech. This is then sent to another FIFO store (5) for transmission to the other conferees. This loudest speech sample is sent to all conferees *other than* the one which originated that sample: he gets a silent code.

The system has two time slots per conferee, one for "talk" and for "listen".

5 Claims, 1 Drawing Figure

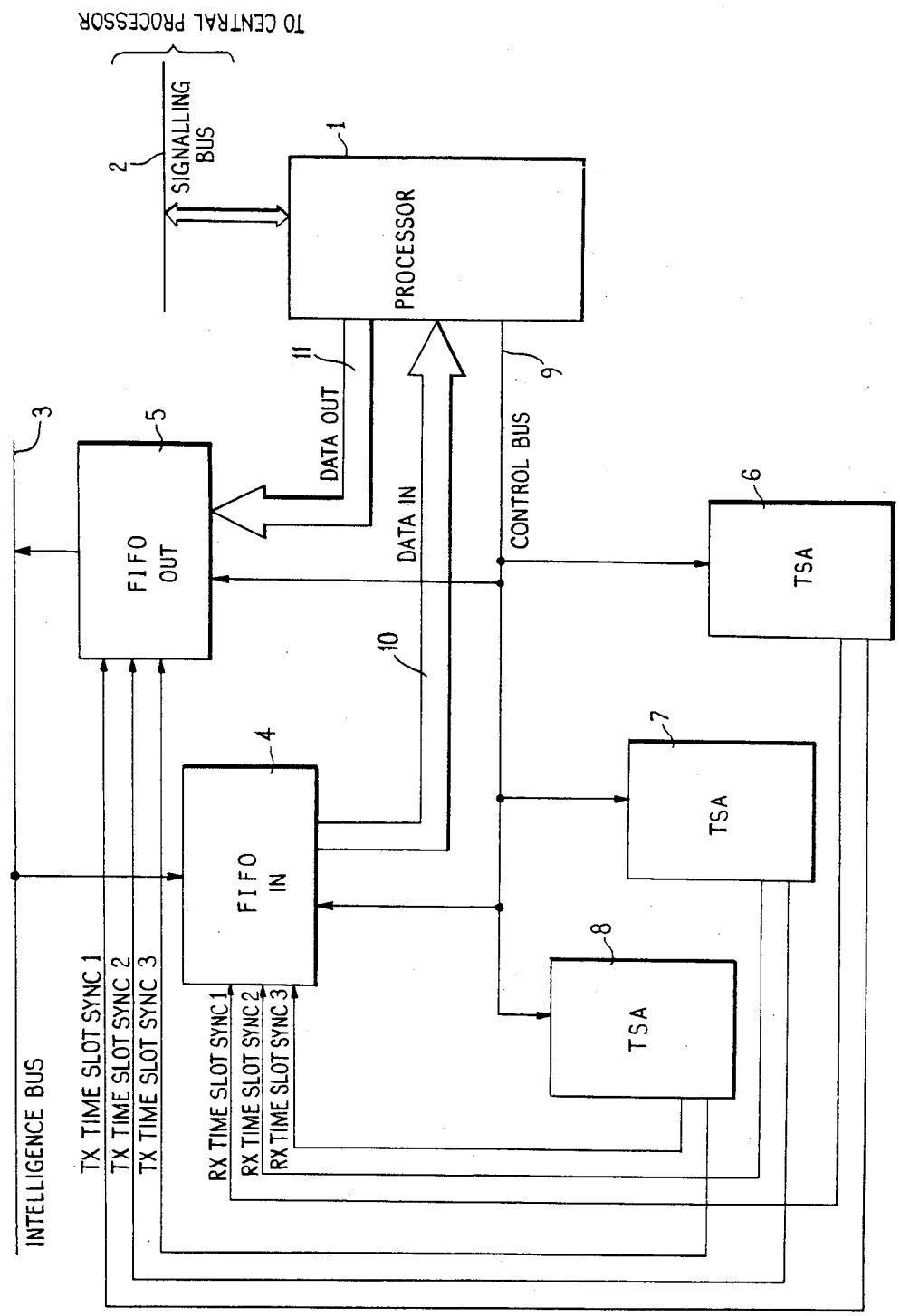

TELEPHONE EXCHANGE CONFERENCE CIRCUIT

This invention relates to a conference circuit for a telephone exchange, especially for a small exchange such as a PABX in a small organisation.

According to the present invention there is provided a telephone exchange conference circuit, for setting up a conference call including n exchange terminations, where n is an integer greater than 2, in a PCM-TDM telephone exchange, which includes an input store for the reception of n PCM code bytes from the conferees, an output store from whih n PCM code bytes can be sent to the conferees, a processor which controls the operations of the conference circuit, an input to the processor over which the identities of 2 n TDM time slots to be used for the connection are received when the circuit is in use, there being separate 'talk' and 'listen' time slots allocated to each of the conferees, connections from the processor to the stores via which the input store is set to its condition for the reception of bytes frm the n conferees and the output store via which it is set to its condition for sending bytes to the n conferees, and connections from the stores via which bytes are transferred from the input store to the processor and from the processor to the output store, and wherein on reception of n bytes from the input store the processor performs one or more comparison operations on those as a result of which a byte is sent to each conferee such that each of the conferees receives bytes from the other conferees but does not receive his own byte.

An embodiment of the invention will now be described with reference to the accompanying drawing, which is a highly schematic block diagram of an implementation of the invention.

The arrangement described is intended for use in a telephone exchange such as that of commonly-assigned Sarson et al U.S. application Ser. No. 538,273, filed Oct. 3, 1983, although it is applicable to other time division multiplex (TDM) telephone exchanges using PCM. For convenience a brief description of our exchange such as that described in that Application follows.

The exchange is a small "business-type" exchange in which calls are set up in TDM manner using PCM to convey speech, and also data if the exchange serves any data terminals. It has subscriber line ports each of which serves two subscriber lines and a smaller number of trunk line ports each of which serves a trunk to a local exchange. Each port has a local processor with, in the case of analogue lines and trunks, analogue-to-digital and digital-to-analogue conversion circuitry. Where a line or trunk is of the digital type, naturally no conversion circuitry is needed. The exchange has a central processor, with its associated memories and interfaces.

The ports and the central processor are interconnected by an intelligence bus, referred to as the PCM bus, and by a signalling bus. The PCM bus has separate conductors for the two directions of transmission. The central processor and the port processors co-operate in call setting, with all inter-processor communications taking place over the signalling bus. During operations, the central processor polls the ports' processors via the signalling bus in search of ports needing the services of the central processor. This polling technique is also used for the transmission of information from the central processor to the ports, this of course including call setting information.

To set up a call between two lines, or a line and a trunk, two time slots in the TDM cycle are allocated to that call by the central processor, one for each direction of transmission. By this time the central processor will have identified the calling line from the time slot in the polling cycle in which the calling line was identified. It will also have received the identity of the wanted line or trunk. Note that the operation is similar if the calling condition was detected on a trunk. Call release is effected when, in the course of polling, the central processor detects that one of the parties to the call has hung up.

With the use of a standard 32 time slot PCM system, two of the time slots are permanently allocated to the emission of tones (e.g. calling tone, busy tone, etc.) and the other 30 slots are available for call setting. Thus if the system is to be non-blocking the total number of lines and trunks served is 15, e.g. 10 lines and 5 trunks. Two such exchanges can be coupled by linking their busses to give a double capacity exchange. Note that the number of lines and/or trunks served can be increased if some blocking is tolerated.

As will have been seen, a major feature of the above-described exchange is that call signalling and other transmissions needed for call setting and control are effected over the signalling bus. Thus the intelligence bus only conveys the PCM codes for speech (or data if there are data terminals) and tones.

The exchange is provided with two conference circuits, each of which can be used to set up a three-party conference, as will be described later. It also has a so-called watch dog controller which continuously monitors the working of the exchange and gives an alarm if certain fault conditions are detected.

Each conference can be either two lines and one trunk, one line and two trunks (if desired—this facility is currently not allowed in an exchange connected to the British Telecoms network), or three lines. As will be seen a conference circuit receives the A-law PCM code combinations representing the speech from the three parties and selects the one for the largest speech amplitude. This selected combination is then passed to the "listen" time slots of the parties whose combinations indicate lower (or zero) amplitudes. Thus a conferee always hears the loudest conferee's voice, but does not hear himself via his earphone.

The control of the conference circuit is by a microprocessor in this case an Intel 8041A UPI, which acts as a signalling interface processor for the conference circuit. It is connected to the signalling bus in a manner similar to that used for the port processors referred to above.

When a conference request is received by the central processor over the signalling bus, the central processor allocates two time slots, one for "talk" and one for "listen" to each conferee. The time slot allocation devices of the individual lines or trunks are now, via the signalling bus, set to these allocated slots for the duration of the conference call. The six time slots thus allocated are also signalled to the conference circuit processor, which then sets its input and output PCM stores to their conditions appropriate to those time slots.

The conference circuit is caused by its processor to read out serially the PCM bytes for each of the three "talk" time slots, converts them to parallel, and loads them into three incoming stores. The three bytes are then compared, and the byte which represents the largest speech amplitude is loaded into the outgoing store for the other two slots. The outgoing store for the selected byte's time slot is loaded with a "silient" code. The three stores are then read, the contents thereof are converted to serial representation, and the serial codes thus produced are then sent via the PCM bus using the three "listen" time slots of the next TDM frame.

We now refer to the drawing, which only shows as much of the circuit as is necessary to understand the invention. The arrangement includes the processor 1 which is connected to the signalling bus 2, and controls all operations of the conference circuit, with the co-operation of the central processor (not shown) and to some extent of the port processors (not shown) of the exchange.

When the central processor receives a request to set up a conference call, with the identities of the three conferees, it allocates two time slots on the intelligence bus 3, one for "talk" and one for "listen", to the call for each of the conferees. The identities of these six time slots are sent to the port processors and to the conference circuits' processor 1 over the signalling bus 2. In response to this, the processor 1 sets its incoming and outgoing stores 4 and 5 to their conditions appropriate to these slots. These stores are first-in-first-out (FIFO) stores, readily available commercially.

The time slot allocations as received by the processor 1 are transmitted to the three TSA (time slot allocation) circuits 6, 7 and 8 over the conference circuits' control bus 9. This bus also extends to the FIFO's to set them appropriately, i.e. to enable the FIFO 4 to receive the bytes from the three conferees, and to enable the FIFO 5 to be set to its conditions to send its contents to the three conferees.

The FIFO 4 thus receives the three bytes over the intelligence bus 3, and it converts them into parallel format. They are now passed via the DATA IN channel 10 to the processor 1, which compares them and selects the byte representing the largest signal amplitude. This byte is passed via the DATA OUT channel 11 to the FIFO 5 where it is loaded, under processor control into the portions of that FIFO for the other two conferees' time slots. In addition a "silent code" byte is sent to the FIFO 5 for loading into the portion thereof for the selected conferee's time slot. The FIFO 5 converts each of the bytes which it has received into serial format, and sends them out on the intelligence bus 3 during the next time frame, using the three "listen" time slots for that next frame.

When the central processor detects that the conference call has ended, a suitable signal is sent therefrom to the processor 1 via the signalling bus 2, and this causes the conference circuit to be cleared and released. This can be a complete release of all three parties, or a release of only one party to leave a normal two party call.

Although the arrangement has been described for three-party conference it will be appreciated that the technique used is not so limited, and that it can be used for larger conferences.

Another method of performing the conference selection at the processor which is specifically intended for use when there are three conferees, hereinafter called A, B and C, will now be described. In this method the processor does three comparisons, as follows:

(a) the bytes received from conferees A and B are compared and the larger of the two is sent in the listen time slot to conferee C.

(b) the bytes from conferees B and C are compared and the larger of the two is sent in the listen time slot to conferee A.

(c) the bytes from conferees C and A are compared and the larger of the two is sent in the listen time slot to conferee B.

In this case no silent code is required.

We claim:

1. A telephone exchange conference circuit, for setting up a conference call including n exchange terminations corresponding to n conferees, where n is an integer greater than 2, in a PCM-TDM telephone exchange, comprising:

an input store for the reception of n PCM code bytes from the conferees;

an output store from which n PCM code bytes can be sent to the conferees;

a processor which controls the operations of the conference circuit;

an input to the processor over which the identities of 2 n TDM time slots to be used for the connection are received when the circuit is in use, there being separate 'talk' and 'listen' time slots allocated to each of the conferees, which 2 n time slots do not need to occur consecutively in a cycle;

connections from the processor to the stores via which the input store is set to its condition for the reception of bytes from the n conferees and to the output store via which said output store is set to is condition for sending bytes to the n conferees; and connections from the stores via which bytes are transferred from the input store to the processor and from the processor to the output store;

wherein the bytes which enter the input store are received from a telephone exchange bus also used for nonconference calls and the bytes which leave the output store go to said same telephone exchange bus;

wherein on reception of n bytes from the input store the processor compares these bytes and selects the one which represents the largest speech amplitude;

wherein the processor, after having made said selection, sends the selected byte to the output store for the time slots for the (n−1) conferees other than the one from which it came;

wherein the processor sends a silent code byte to the output store for the time slot for the selected conferee; and wherein the n PCM bytes thus sent to the output store are sent each at the appropriate one of said time slots to the respective ones of the conferees;

whereby the conferee whose byte is selected as representing the largest speech amplitude receives said silent code byte while the other conferees receive the byte from the selected conferee.

2. A conference circuit as claimed in claim 1, wherein the input store is a first in-first out (FIFO) store which receives the bytes from the n conferees sequentially in serial format, wherein the FIFO store converts all n bytes into parallel format for transmission to the processor, and wherein the output store is also a FIFO store which receives the n bytes from the processor in parallel format and converts them to serial format, whereafter they are sent out, each at its appropriate time slot, to the n conferees.

3. A conference circuit as claimed in claim 1, wherein the exchange is a PABX connected to a local exchange via one or more trunk lines, and wherein a three-conferee call can be establishable between three lines, or between two lines and a trunk, in between a line and two trunks.

4. A conference circuit as claimed in claim 2, wherein the exchange is a PABX connected to a local exchange via one or more trunk lines, and wherein when n=3 a conference call can be establishable between three lines, or between two lines and a trunk, in between a line and two trunks.

5. A telephone exchange conference circuit, for setting up a conference call including n exchange terminations corresponding to n conferees, wherein n is an integer greater than 2, in a PCM-TDM telephone exchange, comprising:
- a processor which controls the operations of the conference circuit;
- an input store for the reception of n PCM code bytes from the conferees, which input store is of the first in-first out (FIFO) type, which receives the bytes from the n conferees sequentially in serial form and converts all n bytes into parallel format for transmission to said processor;
- an output store from which n PCM code bytes can be sent to the conferees, which output store is also a FIFO store and receives the n bytes form the processor in parallel format and converts them to serial format;
- an input to the processor over which the identities of 2 n TDM time slots to be used for the connection are received when the circuit is in use, there being separate 'talk' and 'listen' time slots allocated to each of the conferees, which 2 n time slots do not need to occur consecutively in a cycle;
- connections from the processor to the FIFO stores via which the input store is set to its condition for the reception of bytes from the n conferees and to the output store via which said output store is set to its condition for sending bytes to the n conferees; and
- connections from the FIFO stores via which bytes are transferred form the input store to the processor and from the processor to the output store;

wherein the bytes which enter the input store are received from a telephone exchange bus also for nonconference calls and the bytes which leave the output store go to said same telephone exchange bus;

wherein on reception of n bytes from the input store the processor compares these bytes and selects the one which represents the largest speech amplitude;

wherein the processor, after having made said selection, sends the selected byte to the output store for the time slots for the (n−1) conferees other than the one from which it came;

wherein the processor sends a silent code byte to the output store for the time slot for the selected conferee; and wherein the n PCM bytes thus sent to the output store are sent at the appropriate one of said time slots to the respective ones of the conferees, said bytes being sent from the output store each in serial format;

whereby the conferee whose byte is selected as representing the largest speech amplitude receives said silent code byte while the other conferees receive the byte from the said selected conferee.

* * * * *

UNITED STATES PATENT AND TRADEMARK OFFICE
CERTIFICATE OF CORRECTION

PATENT NO. : 4,566,096

DATED : January 21, 1986

INVENTOR(S) : Gary A. Sarson and Michael P. McKenzie

It is certified that error appears in the above-identified patent and that said Letters Patent is hereby corrected as shown below:

On the cover page, the Appl. No. should read
-- 539,412 --.

Signed and Sealed this

Fifteenth Day of July 1986

[SEAL]

Attest:

DONALD J. QUIGG

Attesting Officer

Commissioner of Patents and Trademarks